(No Model.)

H. J. HAYS.
MOLD FOR MANUFACTURING LAMPS, &c.

No. 598,224.  Patented Feb. 1, 1898.

5 Sheets—Sheet 1.

WITNESSES:
Chas. F. Miller.
F. E. Gaither

INVENTOR,
Harry J. Hays
by Damon S. Wolcott
Att'y.

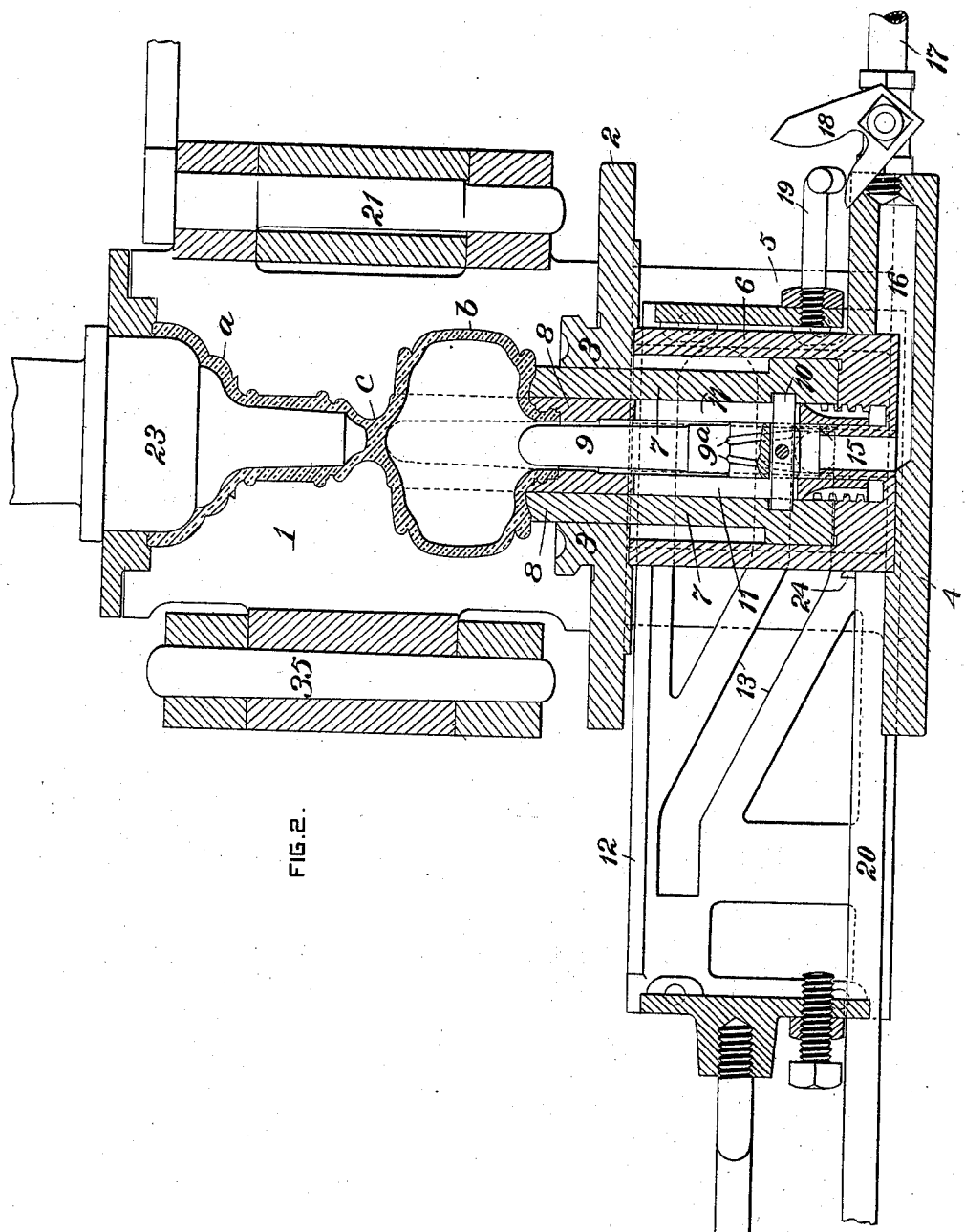

(No Model.)

H. J. HAYS.
MOLD FOR MANUFACTURING LAMPS, &c.

No. 598,224. Patented Feb. 1, 1898.

WITNESSES:
Chas. F. Miller.
F. E. Gaither.

INVENTOR,
Harry J. Hays
by Darwin S. Wolcott
Att'y.

(No Model.) 5 Sheets—Sheet 4.

H. J. HAYS.
MOLD FOR MANUFACTURING LAMPS, &c.

No. 598,224. Patented Feb. 1, 1898.

WITNESSES:
Chas. F. Miller
F. E. Gaither

INVENTOR,
Harry J. Hays
by Darwin S. Wolcott
Att'y.

(No Model.)  5 Sheets—Sheet 5.

H. J. HAYS.
MOLD FOR MANUFACTURING LAMPS, &c.

No. 598,224. Patented Feb. 1, 1898.

WITNESSES:
Chas. F. Miller
F. E. Gaither

INVENTOR,
Harry J. Hays
by Darwin S. Wolcott
Att'y.

UNITED STATES PATENT OFFICE.

HARRY J. HAYS, OF BALDWIN, PENNSYLVANIA.

MOLD FOR MANUFACTURING LAMPS, &c.

SPECIFICATION forming part of Letters Patent No. 598,224, dated February 1, 1898.

Application filed April 23, 1895. Renewed November 19, 1896. Serial No. 612,781. (No model.)

*To all whom it may concern:*

Be it known that I, HARRY J. HAYS, a citizen of the United States, residing at Baldwin township, in the county of Allegheny and State of Pennsylvania, have invented or discovered certain new and useful Improvements in Molds for the Manufacture of Lamps, &c., of which improvements the following is a specification.

The invention described herein relates to certain improvements in molds for the manufacture of glass lamps and other articles wherein a portion of the article is formed by pressing and the remaining portion by blowing.

It has heretofore been the practice in the manufacture of lamps having a glass bowl and stand or foot to press the latter in a suitable mold, remove it from the mold, and while hot, or after suitably heating the upper portion, gather a ball of glass on a blowpipe, attach it to the heated stand or foot, and then blow the bowl. After the bowl has been blown the blow-over is broken off, the ragged edges ground or otherwise smoothed off, and the article annealed.

The object of the present invention is to provide suitable and desirable means for simultaneously pressing the foot or stand portion, the neck, and a blank adapted to form the bowl, and then, without removing the pressed parts from the mold, blowing the bowl to final shape and size.

The improvement claimed is hereinafter fully set forth.

Figure 1:
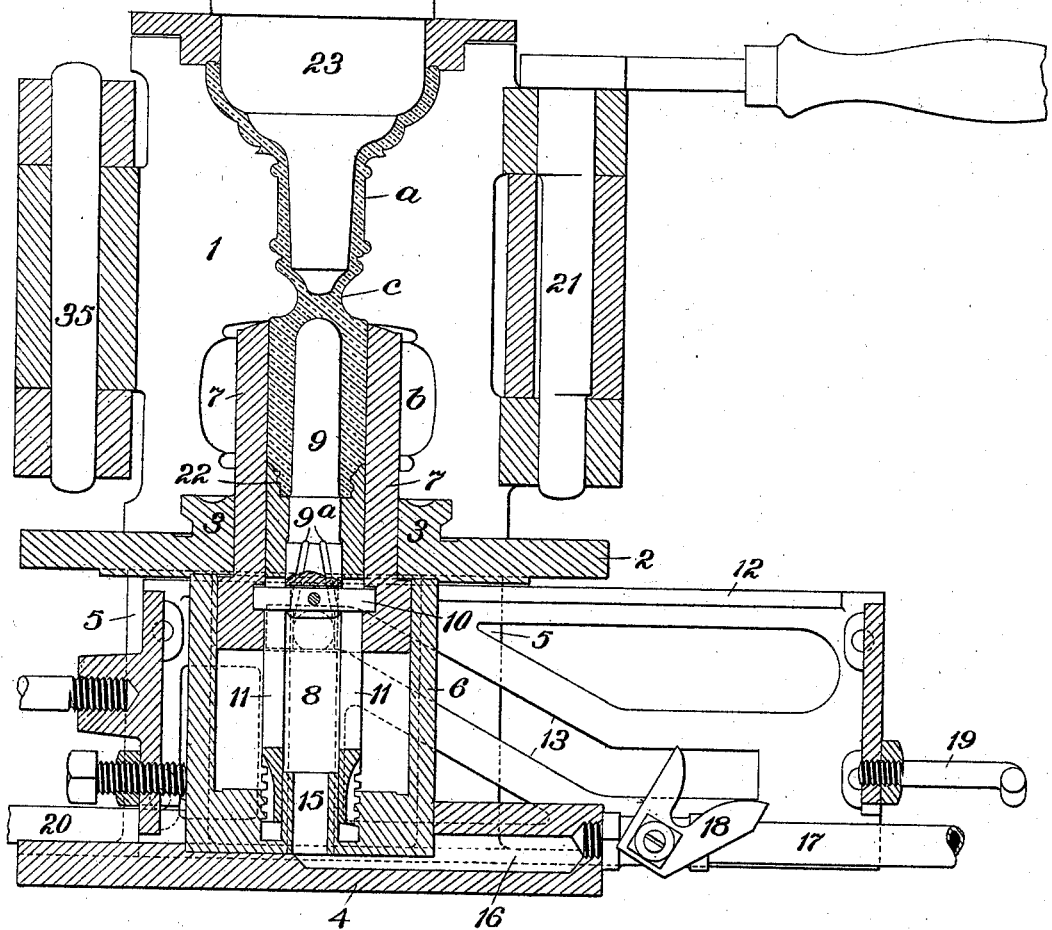
Figure 4:
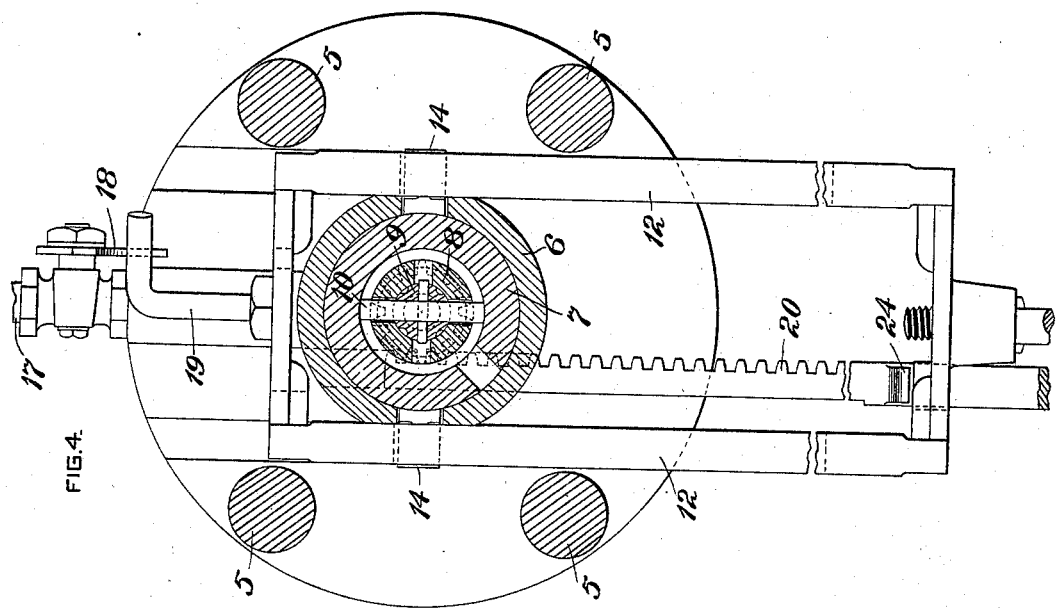
Figure 3:
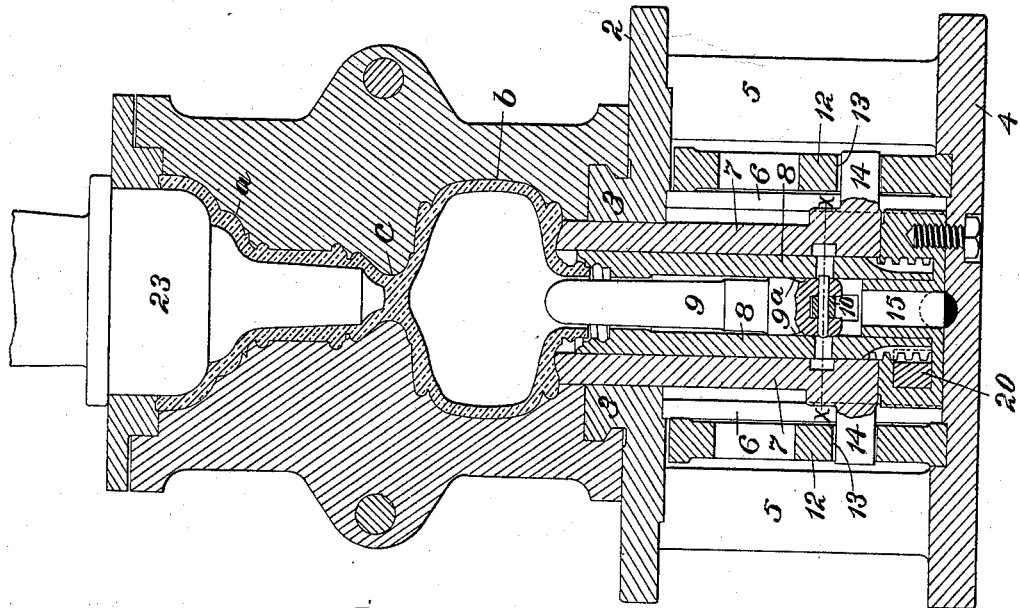
Figure 6:
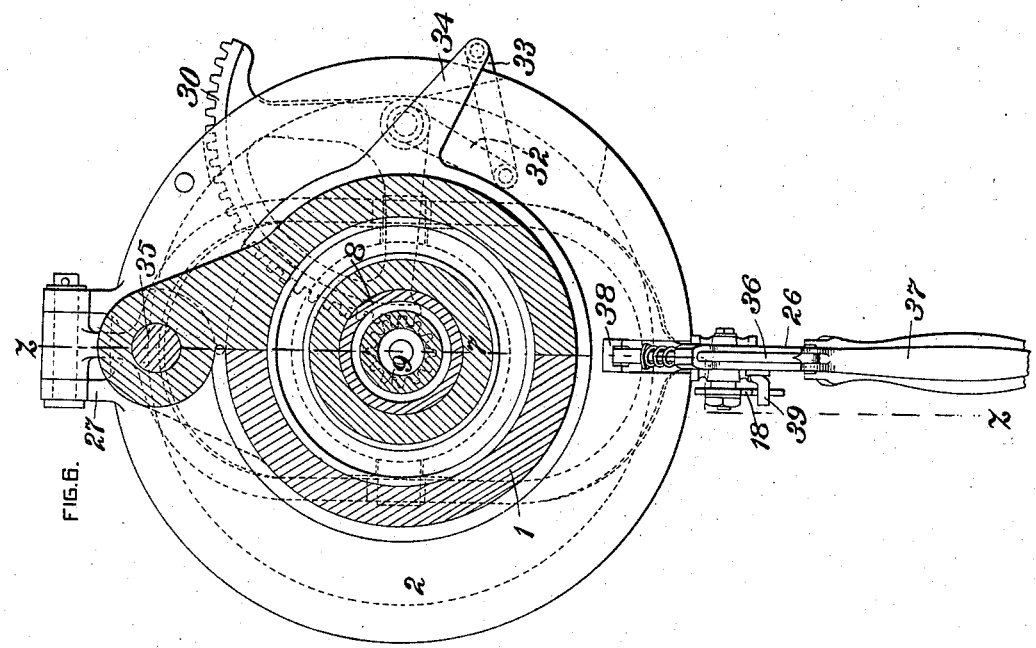
Figure 5:
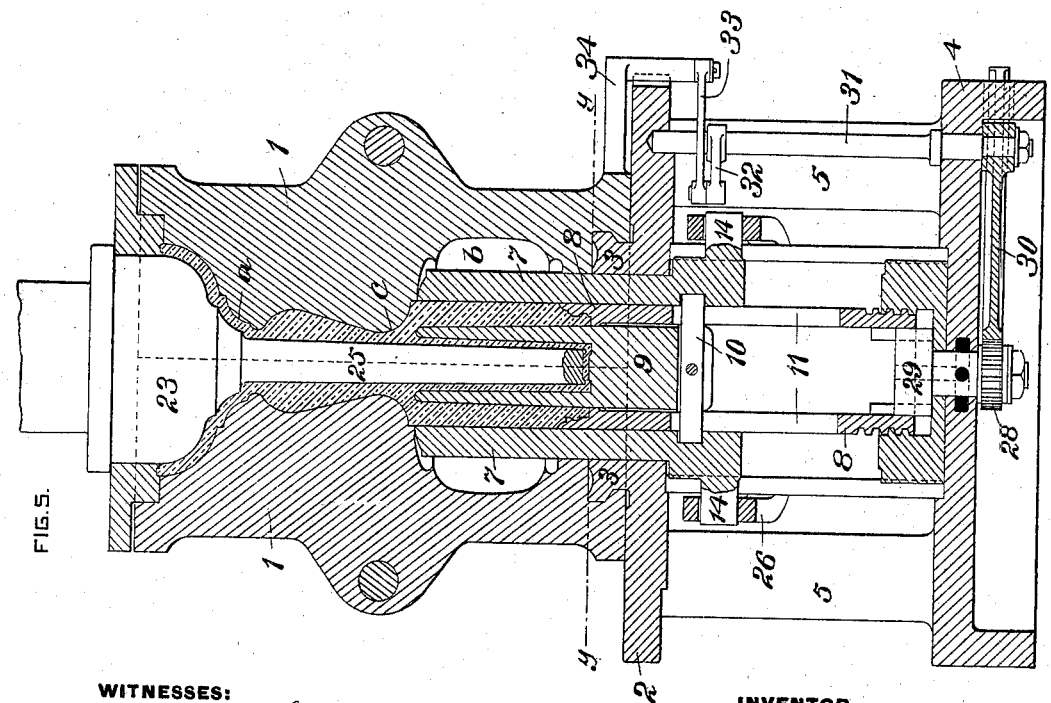
Figure 7:
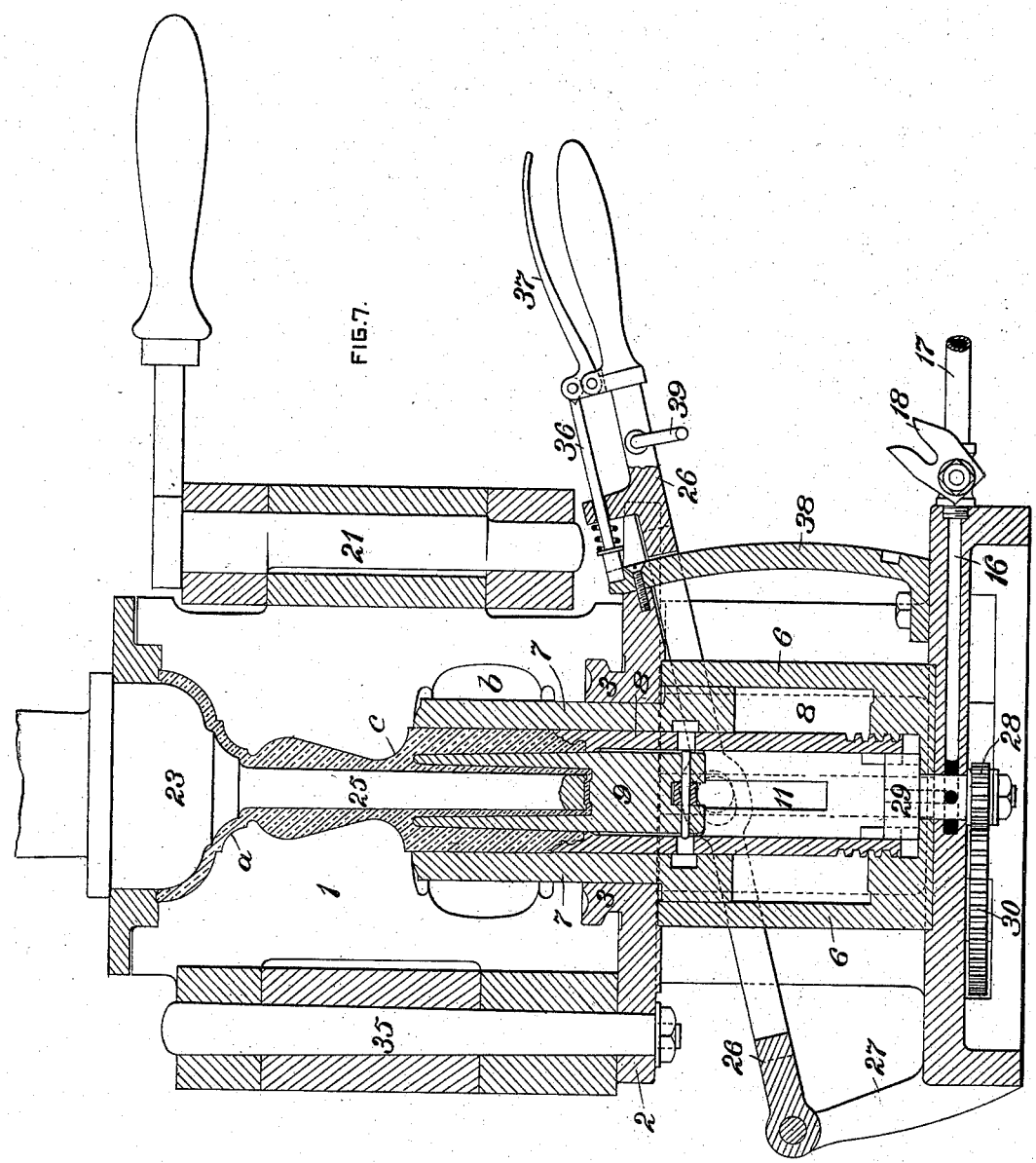

In the accompanying drawings, forming a part of this specification, Figure 1 is a sectional elevation of an apparatus embodying my invention, the several parts of the apparatus being shown in the positions they occupy after the pressing operation. Fig. 2 is a similar view showing the position of the parts of the apparatus after the bowl has been blown. Fig. 3 is a sectional elevation of the apparatus, the plane of section being at right angles to that on which Figs. 1 and 2 were taken, showing the position of the parts for opening the mold. Fig. 4 is a sectional plan view, the plane of section being indicated by the line $x\,x$, Fig. 3. Fig. 5 is a sectional elevation similar to Fig. 3, showing a construction of apparatus for the manufacture of central-draft lamps. Fig. 6 is a sectional plan view, the plane of section being indicated by the line $y\,y$, Fig. 5; and Fig. 7 is a sectional elevation, the plane of section being indicated by the line $z\,z$, Fig. 6.

The mold 1, which is made in two, three, or more sections, as is customary, is fitted upon a table 2, provided with an upwardly-projecting boss 3. This boss has an undercut periphery, forming a projection adapted to fit in a correspondingly-shaped groove in the inner wall of the mold. The mold is provided with a matrix $a$ for the formation of the stand or foot of the lamp, a matrix $b$ for the formation of the bowl, and a matrix $c$ for the formation of the stem connecting the stand and bowl.

The table is supported a suitable distance from the base-plate 4 by posts or standards 5, and between the table and base-plate is placed the shell 6, which serves as a guide for the movable cylinder 7. This cylinder, which forms the matrix for the bowl-blank, projects during the pressing operation up through the boss 3 and into the bowl-matrix $b$, its upper end bearing against the upper wall of said matrix around the stem-matrix $c$. Within the cylinder is placed a hollow rotatable plug 8, and within the plug is fitted the vertically-movable plunger 9, which is connected to the cylinder, so as to move therewith, by a pin 10, passing through the lower end of the plunger and vertical slots 11 in the plug and projecting into a groove in the inner wall of the cylinder near its lower end. This construction permits of the rotation of the plunger with the plug and its vertical movement with the cylinder through which the plunger extends. The lower end of the plunger is cylindrical and fits snugly within the plug, while the body portion is made tapering, so as to permit of its withdrawal from the glass blank, and also permit of the upward passage of air between it and the wall of the plug when the plunger is lowered.

The cylinder is raised and lowered by means of connected slides 12, moving in suitable guideways in the table and base-plate, one on each side of the cylinder, and provided with suitably-shaped grooves 13, into which trunnions 14 on the cylinder project, as clearly shown in Fig. 4. As shown, the grooves 13 extend diagonally across the plates and are provided at their ends with horizontal portions. The upper horizontal portions serve to support the cylinder during the pressing operation, and the lower horizontal portions are made of sufficient length to permit of some back-and-forth movement of the slides without producing any movement of the cylinder, for a purpose to be hereinafter stated.

The lower end of the hollow plug 8 is externally threaded and screws into a threaded opening into the lower end of the shell or case 6. A nozzle 15 is formed within the threaded opening in the end of the shell or case and projects into the lower end of the hollow plug. This nozzle communicates with a passage 16 in the base-plate, said passage being connected to a fluid-pressure-supply pipe 17, which is provided with a valve having a handle 18, adapted to be shifted by a projecting finger 19 on the slides 12. The threaded portion of the plug is also provided with teeth for engagement with corresponding teeth on the bar 20, which passes through a transverse opening in the lower end of the case or shell, as shown in Figs. 3 and 4.

In manufacturing lamps in accordance with my invention the slides 12 are shifted so as to raise the cylinder 7 and plunger 9 into the matrix $b$ until the cylinder bears against the upper wall of said matrix, inclosing the opening of the matrix $c$ into the matrix $b$, as shown in Fig. 1. The rack-bar 20 is also shifted so as to rotate the hollow plug 8, thereby, through action of the screw and nut at the lower end of the plug, causing the plug to move up into the cylinder. The upward movement given to the plug is dependent upon the length of neck to be formed on the lamp-bowl and its rotation on the number of threads to be formed on the neck. The mold is closed and locked by the pin 21, which is of the usual or any suitable construction. It will be observed that the hollow plug closes the space between the cylinder and the plunger, forming the bottom of the bowl-blank matrix, and is provided at its upper end with a recess or matrix 22, adapted to form the neck on the bowl. The side wall of this recess may be made smooth or provided with grooves and ribs to form external threads on the neck of the bowl. The parts being in the position stated and the mold closed, a sufficient quantity of glass is placed in the matrix $a$ and subjected to the action of the plunger 23, whereby it is caused to conform to the matrices $a$ and $c$ and to fill the blank-matrix formed by the cylinder 7, plug 8, and plunger 9. The glass is also caused to fill the recess or matrix 22 in the upper end of the plug 8, thereby forming a pressed-glass neck for the lamp-bowl. As soon as the glass is pressed, as described, the slides 12 are shifted, thereby stripping the cylinder from the bowl-blank and withdrawing the plunger from said blank. As soon as the cylinder and plunger have been withdrawn, as stated, air is forced into the blank, thereby causing it to expand and conform to the bowl-matrix $b$, as shown in Figs. 2 and 3. The stripping of the blank and the forcing of air into the same should be as nearly simultaneous as possible, and in my apparatus this sequence of operation is effected by permitting a continued movement of the slides 12 after the cylinder and plunger have been lowered, thereby causing the finger 19 to engage and shift the handle 18 of the valve in the pipe 17, opening said valve and permitting air under pressure to flow through the passage 16 and nozzle 17 into the plug 8, up through the grooves $9^a$ in the sides of the cylindrical portion of the plunger, and between the walls of the hollow plug and plunger into the blank. As soon as the blank has been expanded to conform to the matrix $b$ the slides 12 are again shifted to the right sufficiently far to reverse the valve in the pipe 17 and stop the inflow of air, but not far enough to raise the cylinder. The rack-bar 20 is then shifted so as to rotate the hollow plug, causing it to screw down into the nut in the lower end of the shell or case and thereby removing its upper end from the neck of the bowl with a rotary movement. The plunger 23 having been withdrawn, the mold is opened and the lamp complete, except as regards annealing, is removed. In case the wall of the recess 22 is constructed to form threads on the neck of the lamp, the threads at the lower end of the plug 8 should correspond in pitch with those formed in the wall of the recess 22, so that there may not be any injury to the neck or its thread in removing the plug therefrom. It will be observed by reference to Figs. 2 and 3 that the upper ends of the cylinder 7 and hollow plug 8 are constructed to form portions of the wall of the matrix $b$ when lowered. After the lamp has been removed the mold is closed and the slides 12 shifted entirely to the right, thereby raising the cylinder and plunger into the matrix $b$. As the slides 12 are shifted to the right they engage a shoulder 24 on the rack-bar and shift the latter to the right, thereby rotating the hollow plug or blowpipe and causing it to screw up to operative position within the cylinder 7.

My improved apparatus is readily adapted for the manufacture of central-draft lamps by forming an axial recess in the plunger 9, said recess being open at its upper end so as to permit the inflow of glass under the action of the main plunger 23. The glass entering this axial recess is given a tubular form by a projection 25 on the end of the main plunger. This projection, which is made of a diameter less than the diameter of the axial recess by an amount equal to twice the desired thickness of wall in the draft-tube, enters the axial recess as the main plunger descends and imparts a tubular form to the glass in said recess. After the stand or foot bowl blank and draft-tube have been pressed, as described, the cylinder 7 and plunger 9 are withdrawn, as hereinbefore described, and air under pressure is admitted into the annular recess formed in the bowl-blank by the annular plunger 9. The central tube formed by the conjoint action of the annular plunger and projection 25 is supported internally by said projection during the blowing operation and is not therefore in any way injured or distorted.

In Figs. 6 and 7 are illustrated certain modifications in the mechanism for raising and lowering the cylinder 7 and the plunger 9 and also for rotating the hollow plug 8. For raising and lowering the cylinder and plunger a lever 26, provided with arms passing on opposite sides of the cylinder and having slots for the reception of the trunnions 14, is pivoted at one end between ears 27 on the base-plate, while its opposite end projects sufficiently far beyond the table 2 to permit of the easy operation of the lever.

For rapid manipulation of the apparatus it is desirable that the vertical movements of the hollow plug or blowpipe shall coincide with the opening and closing of the mold. The means shown in Figs. 6 and 7 for effecting this conjoint operation consists of a gear-wheel 28, keyed on a hollow pin 29, projecting through the passage 16 in the base-plate and into the lower end of the plug and locked thereto, so as to rotate the plug and a segmental rack 30, engaging the gear-wheel 28. This rack is keyed to a shaft 31, mounted in suitable bearings in the table and base-plate and provided at or near its upper end with a radial arm 32, whose outer end is connected by a link 33 with one of the mold-sections, preferably through the medium of an arm 34, projecting from said section, as clearly shown in Figs. 6 and 7. These parts are so combined that when the mold-sections are closed the hollow plug will be rotated in suitable direction to cause it to move up into operative position, and when the mold is opened the rotation of the plug will be reversed to strip it from the neck of the bowl. In order to secure a true movement of the mold-section operating the plug, the pintle-pin 35 of the mold should pass down into the supporting-table, thereby insuring the movement of the sections in the same arc.

In order to lock the cylinder and plunger in their raised and lowered positions, a spring catch-rod 36, adapted to be operated by a handle 37, is so arranged in the lever 26 that its free end will engage notches in the bar 38, attached, as shown in Fig. 7, to the table and bar-plate. The lever 26 is also provided with a finger 39, adapted to engage and shift the handle 18 of the valve in the air-supply pipe 17.

It is characteristic of my improvement that the entire operation of forming a complete lamp can be effected in nearly the same time as that heretofore required in pressing the foot or stand and that the lamp is complete when removed from the mold, there being no blow-over or any ragged or unfinished edges.

As the neck of the bowl is pressed, and also the central-draft tube, they are always of uniform standard dimensions, thereby facilitating the application of fittings or trimmings thereto.

I claim herein as my invention—

1. In an apparatus for the manufacture of glass lamps and other articles, the combination of a main mold having matrices, a cylinder or blank-mold movable into and out of one of the matrices of the main mold, a hollow plug or blowpipe fitting within the cylinder, a movable plunger operating through the plug or blowpipe, and a main plunger for causing the glass to conform to the several matrices, substantially as set forth.

2. In an apparatus for the manufacture of glass lamps and other articles, the combination of a main mold having a matrix, a cylinder or blank-mold movable into and out of the matrix, a hollow plug or blowpipe fitting within the cylinder and provided with a matrix at its upper end, a movable plunger operating through the plug or blowpipe, means for raising and lowering the cylinder-plug or blowpipe and plunger, and a main plunger for causing the glass to conform to the several matrices, substantially as set forth.

3. In an apparatus for the manufacture of glass lamps, &c., the combination of a main mold having a matrix, a cylinder or blank-mold movable into and out of said mold-matrix, a hollow plug or blowpipe provided with a threaded matrix at its upper end, a movable plunger operating through the plug or blowpipe, means for simultaneously raising and lowering the cylinder and plunger, means for imparting a combined vertical and rotary movement to the hollow plug or blowpipe, and a main plunger for causing the glass to conform to the several matrices, substantially as set forth.

4. In an apparatus for the manufacture of glass lamps, &c., the combination of a main mold provided with a suitable matrix, a cylinder or blank-mold movable into and out of the matrix, a hollow plug or blowpipe fitting within the cylinder, an annular plunger movable through the plug or blowpipe, means for raising and lowering the cylinder and plunger, and a main plunger provided with an extension adapted to enter the annular plunger, substantially as set forth.

5. In an apparatus for the manufacture of glass lamps and other articles by pressing and blowing, the combination of a mold having blowing and pressing matrices, the pressing-matrix being movable into and out of the blowing-matrix, a hollow plug fitting within the mold, a movable plunger operating through the plug, a main plunger for causing a glass to conform to the pressing-matrix and means for introducing air into the mold for causing the glass to conform to the blowing-matrix, substantially as set forth.

6. In an apparatus for the manufacture of glass lamps and other articles, the combination of a mold having a blowing-matrix and a pressing-matrix, the latter being movable into and out of the blowing-matrix, an annular plunger movable into and out of the mold, a main plunger adapted to cause the glass to conform to the pressing-matrix and provided with an expansion or auxiliary plunger adapted to cause glass to conform to the opening in the annular plunger, substantially as set forth.

In testimony whereof I have hereunto set my hand.

HARRY J. HAYS.

Witnesses:
DARWIN S. WOLCOTT,
F. E. GAITHER.